(12) United States Patent
McCline et al.

(10) Patent No.: US 8,799,216 B1
(45) Date of Patent: Aug. 5, 2014

(54) MIRROR RESYNCHRONIZATION OF BULK LOAD AND APPEND-ONLY TABLES DURING ONLINE TRANSACTIONS FOR BETTER REPAIR TIME TO HIGH AVAILABILITY IN DATABASES

(75) Inventors: Matthew C. McCline, Foster City, CA (US); Milena Bergant, San Mateo, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

(21) Appl. No.: 13/107,902

(22) Filed: May 14, 2011

(51) Int. Cl.
*G06F 17/30* (2006.01)
(52) U.S. Cl.
USPC .......................................... 707/610; 707/655

(58) Field of Classification Search
USPC .................................................. 707/610, 655
See application file for complete search history.

(56) References Cited

U.S. PATENT DOCUMENTS

| | | | |
|---|---|---|---|
| 2004/0267809 A1* | 12/2004 | East et al. ................... | 707/104.1 |
| 2006/0235909 A1* | 10/2006 | Oks et al. ...................... | 707/204 |
| 2011/0145201 A1* | 6/2011 | Holst et al. .................... | 707/655 |

* cited by examiner

*Primary Examiner* — Rehana Perveen
*Assistant Examiner* — Alexander Khong
(74) *Attorney, Agent, or Firm* — Fish & Richardson P.C.

(57) ABSTRACT

In a mirrored database system, mirror resynchronization of bulk load and append-only tables during ongoing transactions is optimized for quick repair and high availability by catching up any changes to primary database tables that have not been made to mirror database tables during the transaction itself, and making changes due to ongoing transactions when the databases are synchronized to the resynchronization process.

18 Claims, 7 Drawing Sheets

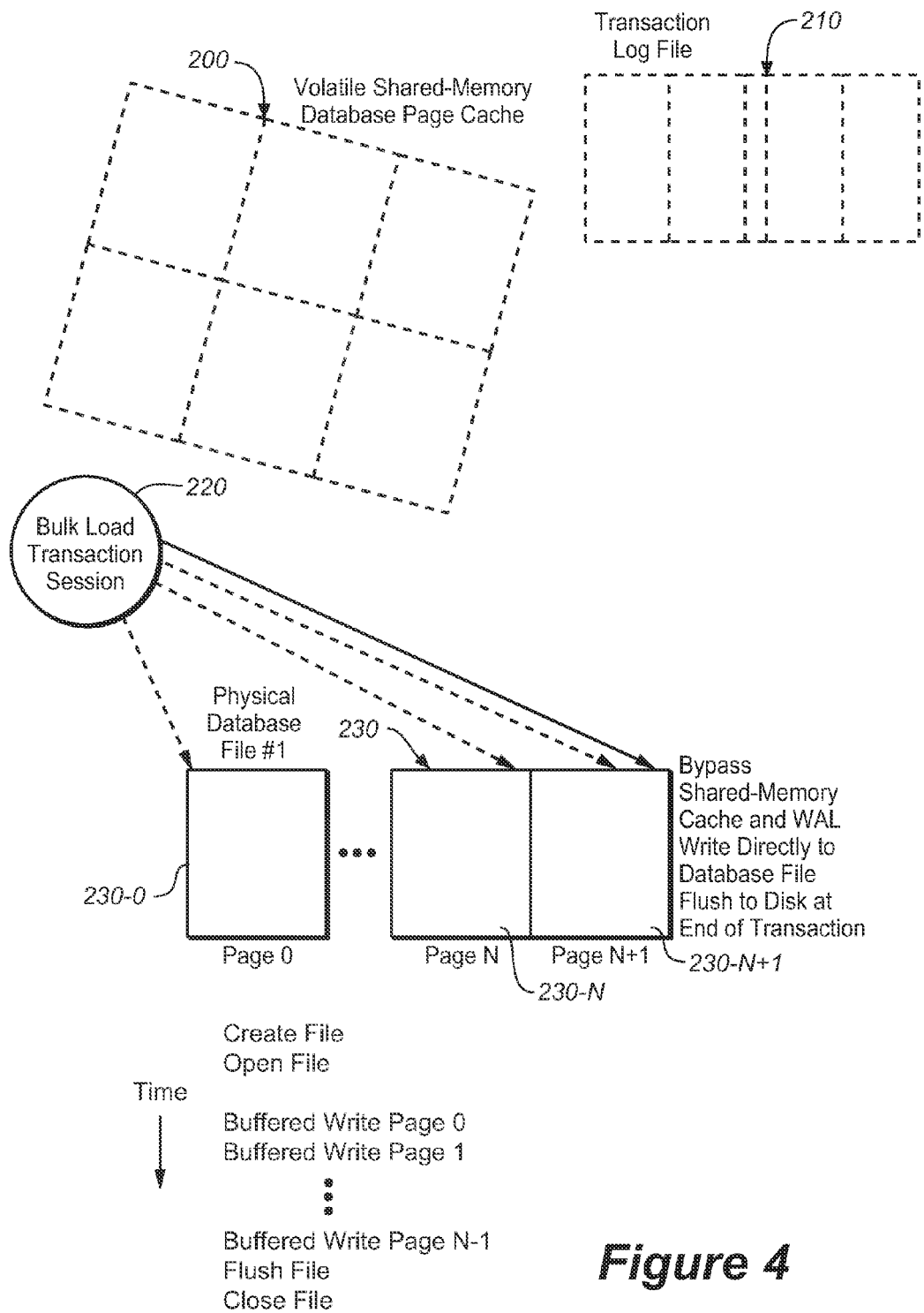

```
                                                              ┌─500
                                                              ▼

┌─501
Lock Mirror-Lock ┘                                                    ┌─502
           //Create entry in Persistent File-System Table in 'Bulk Load Create Pending' state.┘
    503┐  //Sample State of Mirroring State at Beginning
       └─Get Current Mirror State (In-Sync, Change-Tracking, or Re-Sync) and Sequence #┐
       Unlock Mirror-Lock┐                                                              └─504
                ┌─506    └─505
       Create File ┘ ┌─507
       Open File ─┘

┌─508
       Buffered Write Page 0 ┘┌─509
       Buffered Write Page 1 ┘

┌─510
       Buffered Write Page N-1 ┘
       Flush File ┐
                  └─511

┌─LOOP                    ┌─513
   512┘    //Check State of Mirroring State ┘
        ┌─Lock Mirror-Lock
    514┘   Get Current Mirror State (In-Sync, Change-Tracking, or Re-Sync) and Sequence #
    515┘   IF Mirror-Synchronized OR ┐
                                     └─516
           ┌─IN Change-Tracking THEN
       517┘  State Change Persistent File-System Object Table entry 'Create Pending' state
       518┘  Unlock Mirror-Lock ┐
                                └─519
              EXITLOOP ┐
                       └─520

521┌─Unlock Mirror-Lock
    522┘  //Attempt to Catch-Up Mirror
           Copy Primary Data to Mirror (Open, Send-Data-To-Mirror, Flush Mirror)┐
        ENDLOOP ┐                                                               └─523
                └─524

Close File ┐
                  └─525
```

*Figure 5*

```
Lock Mirror-Lock ⌐701
//Sample State of Mirroring State at Beginning ⌐702
Get Current Mirror State (In-Sync, Change-Tracking, or Re-Sync) and Sequence # ⌐703
Unlock Mirror-Lock ⌐704
Open File ⌐705
Position File to End of Previously Committed Data ⌐706
Buffered Write Page 0 ⌐707
Buffered Write Page N-1 ⌐708
...
Flush File ⌐710

//Catch-Up Attempt During Write ⌐711
LOOP ⌐712
    // Check State of Mirroring State ⌐713
    Lock Mirror-Lock ⌐714
    Get Current Mirror State (In-Sync, Change-Tracking, or Re-Sync) and Sequence # ⌐715
    IF Mirror-Synchronized OR ⌐716
       IN Change-Tracking THEN ⌐717
719⌐    Unlock Mirror-Lock ⌐718
         EXITLOOP ⌐720
    Unlock Mirror-Lock ⌐721
    //Attempt to Catch-Up Mirror
    Copy Primary Data to Mirror (Open, Send-Data-To-Mirror, Flush Mirror) ⌐722
ENDLOOP ⌐723
Close File ⌐724
...
//LATER DURING COMMIT TRANSACTION, Another Attempt to Catch-Up ⌐725
LOOP ⌐726
    //Check State of Mirroring State ⌐727
    Lock Mirror-Lock ⌐728
    Get Current Mirror State (In-Sync, Change-Tracking, or Re-Sync) and Sequence # ⌐729
    IF Mirror-Synchronized OR ⌐730
731⌐ IN Change-Tracking THEN
         Increment Shared-Memory Commit-Intent Count ⌐732
         Save New EOF in Memory for COMMIT TRANSACTION ⌐733
734⌐     Log Record
         Unlock Mirror-Lock ⌐735
         EXITLOOP ⌐736
    Unlock Mirror-Lock ⌐737
    //Attempt to Catch-Up Mirror ⌐738
    Copy Primary Data to Mirror (Open, Send-Data-To-Mirror, Flush Mirror) ⌐739
ENDLOOP ⌐740
```

*Figure 7*

MIRROR RESYNCHRONIZATION OF BULK LOAD AND APPEND-ONLY TABLES DURING ONLINE TRANSACTIONS FOR BETTER REPAIR TIME TO HIGH AVAILABILITY IN DATABASES

BACKGROUND

This invention relates generally to mirrored databases used for online transaction processing (OLTP), and more particularly to the resynchronization of bulk load and append-only tables on a mirrored database.

Enterprises employ database systems comprising mirrored databases as a repository of the enterprise's stored data, and to support operational systems such as online transaction processing (OLTP). The databases generally have large sizes, store large volumes of data in tables, and experience high numbers of online transactions.

Mirrored databases comprise a primary database and a mirror database pair that are synchronized by redundantly writing the same data to both databases for backup and to assure high availability of the data if one of the databases fails (crashes). In the event of a crash, or loss of communications with a database, a mirror resynchronization process must be performed by the system to catch up lost changes on the mirror and new changes resulting from new online transactions while the mirror was down in order to restore the databases to a synchronized state. An important measure of database service availability is the time it takes for a mirror database to take over processing once a failure of the primary database has been detected. This time is referred to as the mean-time-to-repair (MTTR). Accordingly, it is important that resynchronization be performed timely so that the database has a very good repair-time and high-availability.

For large database transaction loads it is common for performance reasons to bypass the standard transaction log, also known as the Write-Ahead-Log (WAL), and bulk load (write) transaction-related changes directly to target database files. Bulk load tables are fixed length page tables that are created and loaded in one command. At the end of the command, the table files are flushed to disk. When the mirror database is synchronized, then the files are flushed to both the primary and mirrored disks. The advantage of bypassing the WAL is that a shared memory database page cache in which data is written before writing it to the WAL is not polluted with new pages, and the data is not written twice, i.e., once to the transaction log and a second time to the database file by a background writer.

Bulk loading of tables to database files in the presence of ongoing online transactions creates problems as to how to do mirror resynchronization timely for mirrored databases. Conventionally, mirror resynchronization has to wait until an in-progress bulk load transaction finishes in order to resynchronize that data. Thus, mirror resynchronization can be unduly delayed by the duration of very long bulk load transactions. Further, if there are overlapping bulk load transactions, mirror resynchronization could be delayed for a very long time. Finishing mirror-resynchronize in a timely manner is very important so that the database has very good repair-time and high-availability. Therefore, bulk loading can adversely affect high availability.

It is desirable to provide systems and methods that address these and other problems of timely resynchronization of mirrored databases while writing data directly to database files, as in bulk load and append-only tables, and accommodating changes due to new online transactions to afford good repair time and high availability, and it is to these ends that the present invention is directed.

BRIEF DESCRIPTION OF DRAWINGS

FIG. 4 illustrates a conventional process for loading transaction data directly to a database file;

FIG. 5 illustrates a process in accordance with an embodiment of the invention for creating and loading bulk load tables, and for catch-up resynchronization of a mirror database for bulk loads;

FIG. 7 illustrates a process in accordance with an embodiment of the invention for writing to and for mirror catch-up of append-only tables.

DESCRIPTION OF PREFERRED EMBODIMENTS

The invention is particularly well adapted for re-synchronizing mirrored database pairs comprising a primary database and a mirror database that bulk load or append transaction-related data directly to database files, and will be described in that context. As will be appreciated, however, this is illustrative of only one utility of the invention.

Figure 1:
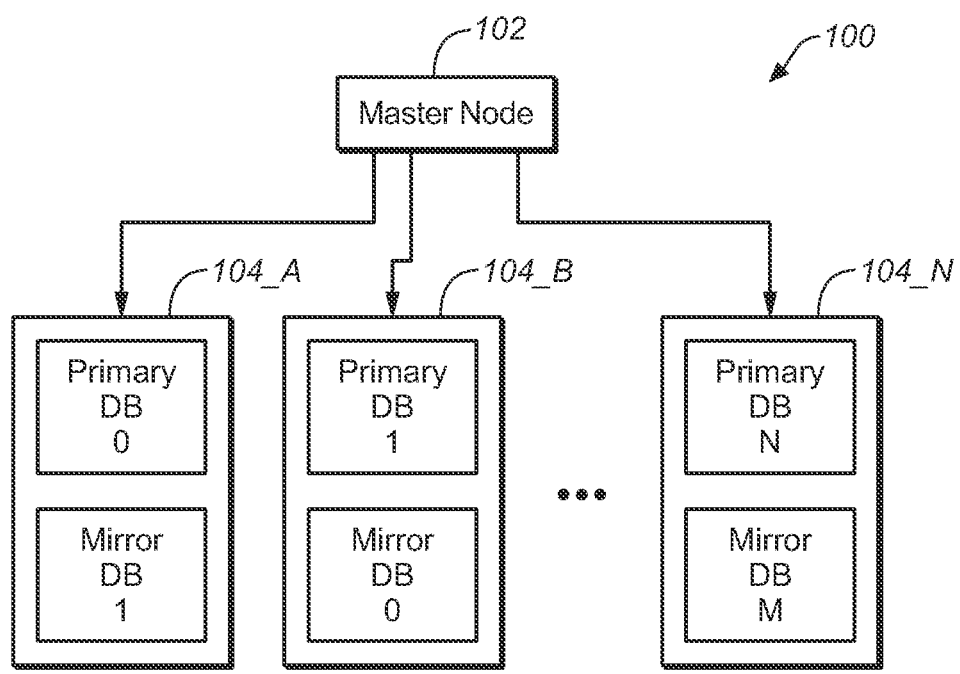
FIG. 1 is a block diagram that illustrates a known network architecture of a logical database cluster in which the invention may be employed.

FIG. 1 illustrates a shared-nothing network architecture of a logical database cluster 100 with which the invention may be employed. The network may include a master node 102 which internally connects to a plurality of shared-nothing nodes 104-A through 104-N. Each node may comprise a plurality of database (DB) segments (database instances) including one or more primary databases and one or more mirror databases. As indicated in the figure, for fault tolerance purposes, a primary database and its corresponding mirror database are located on different nodes. Node 104-A may contain, for example, Primary DB 0 and Mirror DB 1, whereas node 104-B may contain Primary DB 1 and Mirror DB 0. Thus, mirroring Primary DB 0 on node 104-A requires that primary data be written to Mirror DB 0 on node 104-B. Database systems such as illustrated in FIG. 1 may be used as a repository of an enterprise's digital stored data and to provide an architecture for data flow to support operational systems such as online transaction processing (OLTP).

Figure 2:
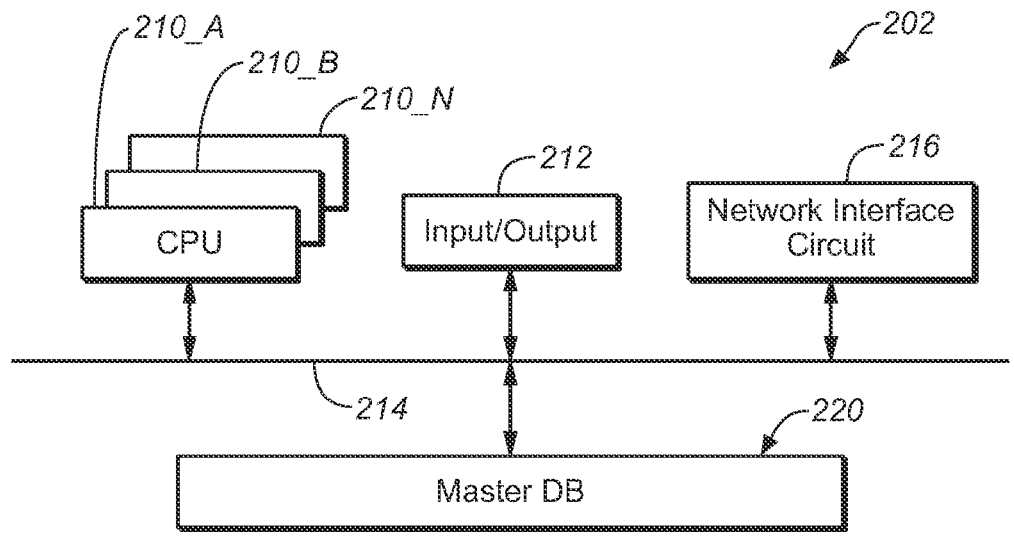
FIG. 2 is a block diagram of a master node of the network of FIG. 1 that may be configured to operate in accordance with an embodiment of the invention.

FIG. 2 illustrates a master node 202 configured to implement operations in accordance with the invention. The master node may comprise a plurality of host CPUs 210-A through 210-N connected to input/output (I/O) Devices 212 by a bus 214. The I/O devices may be primarily disk storage, and may also comprise standard computer system input and output devices. A network interface circuit 216 may also be connected to bus 214 to allow the master node to operate in a networked environment. The master node may also have a memory 220 connected to the bus that embodies executable instructions to control the operation of the host computer system of the node and to perform processes in accordance with the invention. Included in memory 220 is a master database instance to which users connect.

Figure 3:
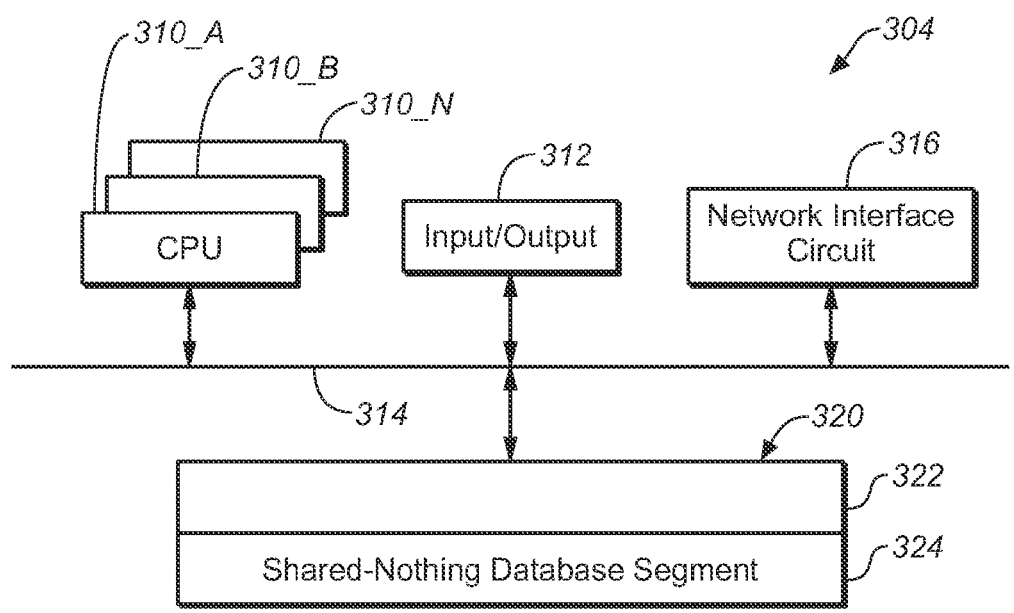
FIG. 3 is a block diagram of a node of the network of FIG. 1 that may be configured to operate in accordance with an embodiment of the invention.

FIG. 3 illustrates a shared-nothing node 304 configured to implement operations in accordance with the invention. Node 304 may have a similar architecture to master node 202, comprising a plurality of host CPUs 310-A through 310-N connected to a bus 314. A set of input/output devices 312, a network interface circuit 316 to afford network connectivity, and a memory 320 may also be connected to the bus. Memory 320 may comprise a first array portion 322 containing data and executable instructions to implement the processes of the invention, and may include one or more shared-nothing database segments 324. The database segments 324 may comprise primary and mirror DB instances.

FIG. 4 is an overview of a conventional process by which transaction-related changes to pages in a database are written directly to database files. Database systems typically have a volatile shared memory database page cache 200 into which changes to database pages are first entered before being buffer written to a transaction log 210, also known as a write-ahead-log (WAL), from which the changes are flushed to disk. In order to increase performance, large database loads such as bulk loads from a transaction session 220 create a target database file 230 into which changes to appropriate pages 230-0, 230-N, 230-N+1 are loaded using buffered (non-write-through) writes. Once the data is written buffered, the file is then flushed to disk, which informs the file system to force any data that has been buffered for the file to disk. The file is then closed.

As will be described, the invention affords a method for efficiently and timely handling of mirror resynchronization in a mirrored database that writes transaction-related changes directly to tables in a database file. In one embodiment the method shifts the duty of catching-up a mirror database to the transaction itself. This minimizes the time required to identify and make required database changes, allows resynchronization to finish quickly, and affords better repair time and high service availability. Since a bulk load table is created and loaded in the same transaction, the burden of resynchronization may be shifted safely to the transaction. If the transaction aborts, both the table and the data will be removed as part of the aborted transaction. Otherwise, after the process has written all of the data to disk and before finishing the command, it may compare the mirror synchronization state captured at the beginning of the command to the current state to see if any catch-up is needed. If so, the process copies the primary table data to the mirror, and flushes the mirrored file pair to disk.

Since all commands are part of transactions, the mirror synchronization state may also be checked during commit preparation to determine whether the mirror pair synchronization has changed. If so, a mirror catch-up is needed at that point, and copying changes to the mirror and flushing the mirror to disk may be performed then.

In accordance with one embodiment, the invention affords persistent records of state changes of file system objects, and provides mirror catch-up copying process logic for a bulk load. The persistent records of state changes may comprise records in a table, one record for each file, containing certain information about the file and its states on the primary and mirror databases. The table, which may be stored as a persistent record on disk, may be similar to the persistent file system object table disclosed in applicants' co-pending application Ser. No. 13/107,898 entitled Persistent File System Objects for Management of Databases, filed May 14, 2011 concurrently herewith, the disclosure of which is incorporated by reference herein.

FIG. 5 illustrates a process 500 in accordance with the invention that affords mirror catch-up logic for mirror resynchronization of bulk load tables during online transactions. The process begins at line 501 by locking the mirror database. When the target file for the bulk load is created, it may be created having a distinct state "bulk load create pending", as indicated at 502. This state tells the resynchronize-mirror operation that this file is not to be resynchronized since it is being written in exclusive mode by the bulk load transaction. While locked, the state of mirroring at the beginning of the process is obtained at line 503. At line 504 the current mirror state and a sequence number (Sequence #) are obtained. The mirror-lock holds these values in an exclusive mode so they are stable and cannot change. The state value can be one of {In-Sync, Change-Tracking, or Re-Sync} for, respectively, synchronized mirrors, mirror down and change-tracking is on, and mirror resynchronized, as will be described in connection with FIG. 6. The Sequence # may be a number that is incremented each time Change-Tracking is entered, and is used to distinguish between different transitions to the In-Sync or Re-Sync states.

After the data has been written buffered at 508 through 510, and the file flushed to disk at 511, a loop may be entered at 512 in which the mirroring state is rechecked under another mirror lock 514-521. If the mirror has remained synchronized during the load, i.e., it started in the In-Sync or Re-Sync state and ended in one of those dates without going through Change-Tracking, then the mirror is current. On the other hand, if at 517 the mirror is in the Change-Tracking state, the mirror is not current and catch-up will be required. Catch-up can be handed off to mirror resynchronization. The state indicated in the entry record in the persistent file system table may then be changed to "Create Pending", as shown at 518. This state indicates that the table is to be resynchronized later when the mirror resynchronization process is performed.

If the mirror is not current, it is the responsibility of the bulk load transaction, and not mirror resynchronization (which is not running at this point), to catch-up the mirror (522-523). The reason that the bulk load transaction is responsible for catch-up is that the mirror either went through or started in change-tracking at least once, so some data may have been lost and not written to the mirror. If the mirror is currently in In-Sync, then the mirror must be up-to-date. If the state is Re-Sync, the mirror must also be synchronized because mirroring is enabling new transactions to keep the mirror synchronized. Since the table is being bulk loaded, it is responsibility of the bulk load transaction, and not mirror resynchronize to maintain mirror synchronization. Data that was just flushed by the bulk load to the primary disk may be sent to the mirror for writing and then flushed. Since the mirror state may have changed during the catch-up, the loop cycles back at 524 to recheck the state of mirroring.

Figure 6:
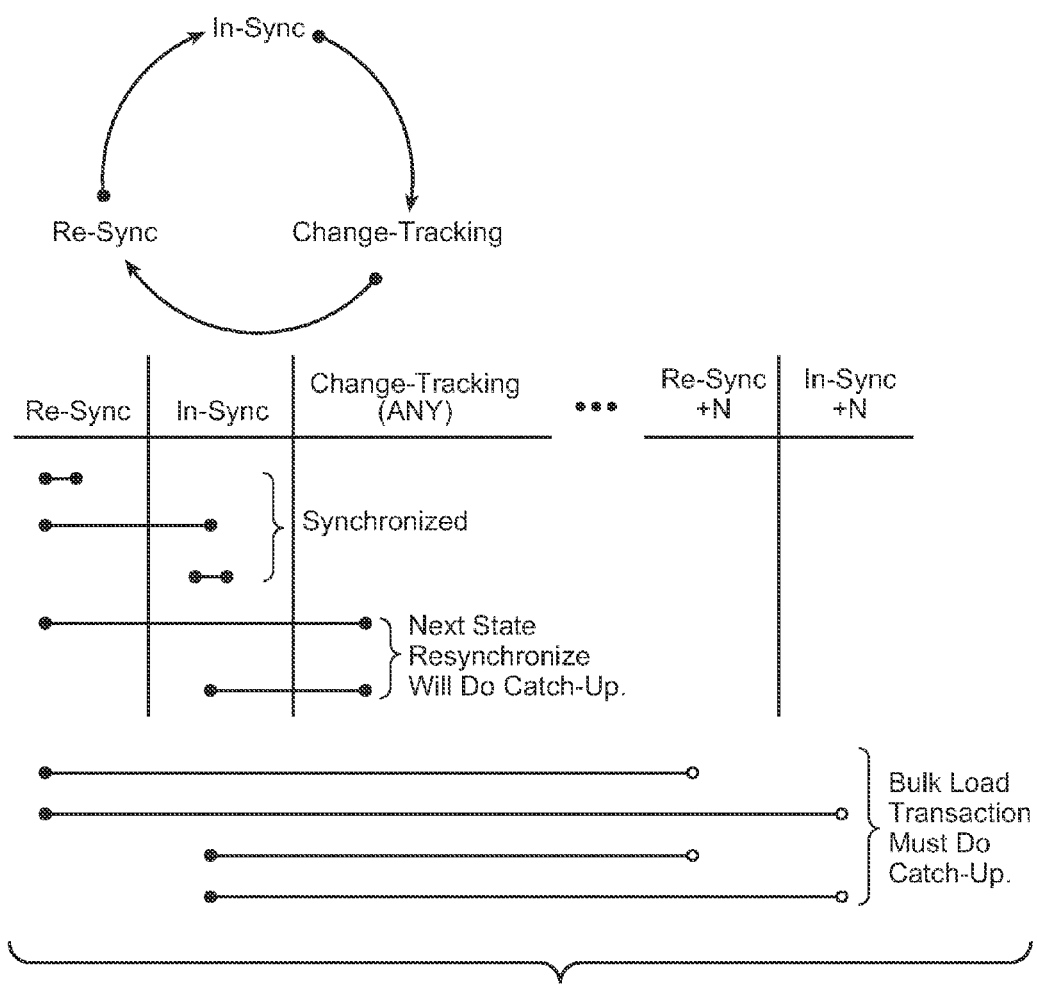
FIG. 6 illustrates the different states through which a mirror database transitions for bulk loads.

FIG. 6 shows the different states through which a mirror database transitions. If mirror database is synchronized, its state will be In-Sync. If the mirror goes down or communications are otherwise lost, it will enter a Change-Tracking state where changes to the primary database are recorded for writing to the mirror during resynchronization (Re-Sync). If a bulk load begins with the mirror up and in either the In-Sync or Re-Sync state, and the transaction ends in one of these states without transitioning through Change-Tracking, then the mirror received all of the load data and is synchronized. However, if a bulk load transaction ends in the Change-Tracking state, no matter what state it started in, the mirror could have lost data. However, since the state is Change-Tracking, the bulk load process can delay catch-up to a later resynchronization. The last situation is one where a bulk load transaction started in either the In-Sync or Re-Sync state and in ended in one of these states, but transitioned due to the mirror being down through the Change-Tracking state at least once. In this case, some mirror data could have been lost so the bulk load transaction must catch-up the mirror itself.

Append-only tables may contain tightly packed variable length blocks, possibly compressed, that are only added at the end of the table files. Append-only tables are similar to bulk load tables. When an insert transaction to an append-only table aborts, it is logically as if the data was never written. Append-only tables may be existing tables that can be appended to by many transactions concurrently and by many transactions collectively during a mirror resynchronization process. Conventionally, append-only files are flushed to disk and closed after writing. However, this is not done in the invention.

The invention catches up append-only table data that is concurrently growing with new online transactions using mirror resynchronization. The process maintains persistent table entries for a committed EOF and a loss EOF for an append-only table. The committed EOF is the EOF on the primary disk of committed append-only data. The known amount of data safety written to the mirror before loss of synchronization is indicated by the loss EOF. Mirror resynchronization may send the data between the loss EOF and committed EOF to the mirror, which writes it. The mirror append-only files are then flushed to disk and the loss EOF in the persistent file system object table entry is updated to the committed EOF value.

Since new online transactions may be pushing out the committed EOF value during mirror resynchronization, in one embodiment the invention may do several things to manage concurrency. First, before appending any new data to an append-only table, the transaction may look momentarily under an exclusive system lock at the committed EOF and the loss EOF values. If they are different, the transaction does not write to the mirrored pair but only to the primary disk, and remembers this fact. Otherwise, if the EOF values are the same, the append-only transaction makes mirrored writes to the databases during resynchronization.

Further, during a commit preparation of a transaction that has appended data to append-only tables, a shared memory intent count may be incremented while briefly holding an exclusive system lock. The intent count is used to communicate to the mirror's resynchronization process that the committed EOF of an append-only table will grow when the transaction commits and that mirror resynchronization should not conclude its process. After post commit has updated the persistent file system object table's committed EOF to the new value, the intent count may be decremented. Before mirror resynchronization exits, it may recheck the intent count under an exclusive system lock to determine if the count is non-zero. If so, it rescans the persistent file system object table looking for new append-only tables that may need to be caught up. These are tables having committed EOF's greater than the loss EOF.

Since mirror resynchronization attempts to make the append-only persistent file system object table committed EOF and loss EOF entries match by sending catch-up data to the mirror, the probability of mirror resynchronization having to rescan goes down with each iteration. Accordingly, rescanning does not unduly delay mirror resynchronization. Also, as with bulk load transactions, append only transactions may be appending data at the point where mirror resynchronization is attempting to conclude its operation. Thus, mirror resynchronization passes catch-up responsibility to the append-only transaction at this point. Additionally, append-only transactions must also compare the mirror synchronization state captured at the beginning of the transaction command and the current state to see if mirror catch-up is required. A further check and a possible catch-up may also be needed during commit preparation.

FIG. 7 illustrates an append-only table mirror catch-up process 700 in accordance with an embodiment of the invention. The append-only process of FIG. 7 is similar to the bulk load process of FIG. 5, but differs in that data is being added to an existing table. As shown, before the database file is opened, and under mirror lock 701-704, the mirror state and a sequence number (Sequence #) are obtained (703). After appending new data with buffered writes 707-708 and flushing the file, a catch-up loop 711-723 that may be substantially the same as loop 512-524 in FIG. 5 is entered. A principal difference between the bulk load and append-only processes is that the newly appended data in an append-only process only gets transferred to the mirror resynchronization process when the transaction commits. Bulk load transactions are able to use the change in state in the persistent file system object table to state "Create Pending" to accomplish this. The append-only table, however, has already been created and is already in a Create Pending state, so this state cannot be used to identify a table that requires resynchronization.

Figure 8:
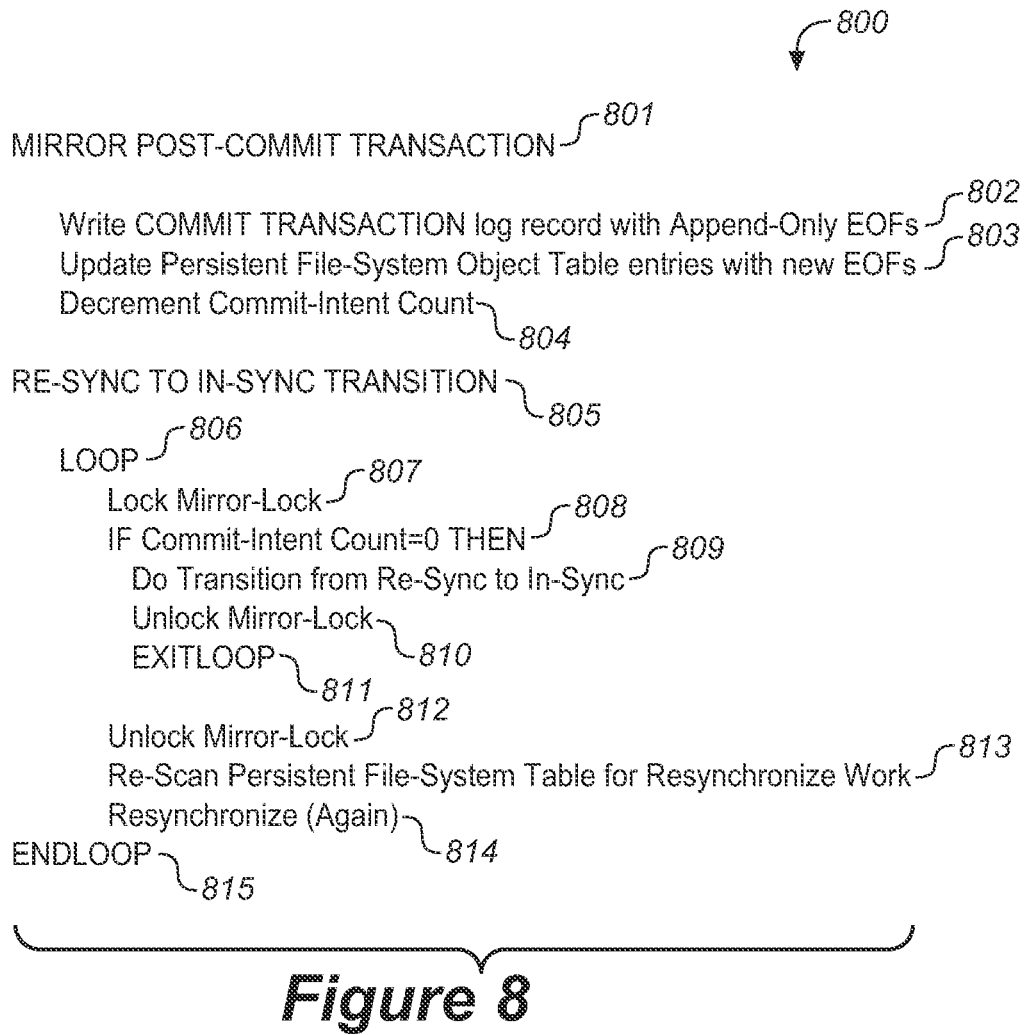
FIG. 8 illustrates a process in accordance with an embodiment of the invention for mirror post-commit processing and for transition from resynchronization to a synchronized state.

During a Commit Transaction, a mirror lock is again obtained (728-737) and catch-up is performed at 738-739, if necessary. While the mirror is locked, a shared memory counter referred to as Commit-Intent counter may be incremented at 732. This delays the transition of the mirror resynchronization process from Re-Sync to In-Sync. After the commit transaction log record is written and flushed to the transaction log, the Commit-Intent count will be decremented, as shown in FIG. 8, 804, which will allow mirror resynchronization to complete. During the Commit Transaction, the new EOF is saved at 733 to update the persistent file system object table entry during post-commit processing to the new committed EOF. Mirror resynchronization will use this new committed EOF to determine how much data needs to be caught up on the mirror database.

FIG. 8 illustrates a process in accordance with an embodiment of the invention for post-commit transaction processing and for transition from Re-Sync to In-Sync. The figure shows the interplay between post-transaction for decrementing the Commit-Intent count for append-only transactions and the mirror resynchronization operation for an append-only transaction to determine if it may transition from a Re-Sync state to an In-Sync state.

When a transaction has formally committed, the committed append-only EOF value stored in the persistent file system object table may be updated with the new committed EOF value, as indicated at 803. Mirror resynchronization uses this value of EOF to indicate how much data needs to be resynchronized, as indicated above. An advantage of having the EOF value recorded in the persistent file system object table is that mirror resynchronization need not try to access a system catalog, including trying to lock entries, to obtain this EOF. When the mirror resynchronization process scans the persistent file system object table and determines which tables need to be resynchronized, i.e., have their mirrored data caught up and the table entries updated with new EOFs, the Commit-Intent count in shared memory may be decremented (804), as described in connection with FIG. 7.

After mirror resynchronization has successfully resynchronized all tables that were indicated to be necessary for resynchronization in the persistent file system object table, the process enters a loop 806-815 in which it checks under a mirror lock whether the Commit-Intent count is zero (808). If so, the process transitions from Re-Sync to In-Sync, and unlocks the mirror at 812. Otherwise, the process rescans the persistent file system table for newly committed append-only tables that need to have data resynchronized. This is data that a new transaction only just wrote fully to the primary database, and the responsibility for catching up the mirrored database will be transferred to the mirror resynchronization process because the transaction is still in progress. Mirror resynchronization resynchronizes the tables at 814 and then loops back to 807 to recheck for any additional tables that may need to be resynchronized. If there are none, the process ends at 815.

As may be appreciated from the foregoing, the invention optimizes mirror resynchronization of bulk load and append-only tables during ongoing online transactions to afford a good repair time and high availability by catching up the mirror database as part of the transaction.

An embodiment of the invention affords a computer storage product comprising a computer readable storage medium storing executable computer instructions for controlling the operations of computer systems to perform the processing operations described herein. The computer readable medium may be any standard media well known and available to those skilled in the art, including, but not limited to magnetic media such as hard disks, floppy disks, magnetic tape; optical media such as CD-ROMs, DVDs, holographic devices; magneto-optical media; and hardware devices configured to store and execute program code, such as application-specific integrated circuits (ASICs), programmable logic devices and ROM and RAM devices.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A method of mirror resynchronization of bulk load tables written to by online transactions in a mirrored pair of databases comprising a primary database and a mirror database, comprising:
    creating a bulk load target file;
    writing transaction data from an online transaction into said target file;
    determining whether said primary database and said mirror database remained in a synchronized state during said writing;
    upon determining that said primary database and said mirror database remained in said synchronized state during said writing, concurrently bulk loading said target file directly to both a primary page table in said primary database and to a mirrored page table corresponding to said primary page table in said mirror database;
    otherwise, upon determining said primary database and said mirror database were in an unsynchronized state during at least part of said writing, bulk loading said target file only to said primary page table and catching up said mirror database as part of said transaction during mirror resynchronization;
    checking the synchronization state of said mirror database during transaction commit preparation; and
    upon determining that said primary database and said mirror database were in said unsynchronized state, said catching up further comprises copying changes to said primary database page table data to the mirror database and flushing the mirror to disk.

2. The method of claim 1, wherein said determining comprises determining whether said mirror database transitioned through a change-tracking state during said writing.

3. The method of claim 2 further comprising recording persistent records of changes in synchronization states of said mirror database, and said determining comprises checking said records for said transition through said change-tracking state.

4. The method of claim 2, wherein said catching up comprises copying primary database page table data to said mirror database page table.

5. A non-transitory computer readable storage medium comprising executable instructions for controlling the operation of a computer to perform mirror resynchronization of tables written by online transactions in a mirrored pair of databases comprising a primary database and a mirror database, comprising instructions for:
    creating a bulk load target file;
    writing transaction data from an online transaction into said target file;
    determining whether said primary database and said mirror database remained in a synchronized state during said writing;
    upon determining that said primary database and said mirror database remained in said synchronized state during said writing, concurrently bulk loading said target file directly to both a primary page table in said primary database and to a mirrored page table corresponding to said primary page table in said mirror database;
    otherwise, upon determining said primary database and said mirror database were in an unsynchronized state during at least part of said writing, bulk loading said target file only to said primary page table and catching up said mirror database as part of said transaction during mirror resynchronization;
    checking the synchronization state of said mirror database during transaction commit preparation; and
    upon determining that said primary database and said mirror database were in said unsynchronized state, said catching up further comprises copying changes to said primary database page table data to the mirror database and flushing the mirror to disk.

6. The non-transitory computer readable storage medium of claim 5 further comprising instructions determining whether said mirror database transitioned through a change-tracking state during said writing.

7. The non-transitory computer readable storage medium of claim 6, wherein said instructions for recording persistent records of said synchronization states, and said determining comprises checking said records for said transition through said change-tracking state.

8. The non-transitory computer readable storage medium of claim 6, wherein said catching up comprises copying primary database page table data to said mirror database page table.

9. A method of mirror resynchronization of append-only tables in a mirrored pair of databases comprising a primary database and a mirror database, comprising:
    opening a target file;
    writing said target file at the end of previously committed data in a primary append-only table in the primary database;
    determining whether the primary database and the mirror database are in a synchronized state; and writing said transaction data from an online transaction into the target file in the primary append-only table in the primary database and, if said primary database and said mirror database are determined to be in said synchronized state, mirror writing said transaction data in the target file to another end of previously committed data in a mirror append-only table corresponding to said primary append-only table in the mirror database;

otherwise, if the primary database and the mirror database are not in a synchronized state, writing said transaction data in the target file only in the primary append-only table and catching up said mirror database during mirror resynchronization.

10. The method of claim 9 further comprising determining a committed End of File (EOF) of the append-only data on said primary database and a loss EOF of data written to the mirror database before a loss of synchronization, and sending data written to the primary database target file between the committed EOF and the loss EOF for writing to the mirror database during mirror resynchronization.

11. The method of claim 10, wherein, before appending new data to said mirror append-only table, checking, under a system lock, the committed EOF and the loss EOF, and writing only to the primary database if the EOFs are different.

12. The method of claim 11, wherein, upon the committed and loss EOF being the same, mirror writing to the primary database and the mirror database during resynchronization.

13. The method of claim 12, wherein during said transaction committing, recording a new committed EOF as a persistent entry in a table and using said new committed EOF during mirror resynchronization to catch up the mirror database.

14. A non-transitory computer readable storage medium comprising executable instructions for controlling the operation of a computer to perform mirror resynchronization of append-only tables in a mirrored pair of databases comprising a primary database and a mirror database, comprising instructions for:

opening a target file;

writing said target file at the end of previously committed data in a primary append-only table in the primary database;

determining whether the primary database and the mirror database are in a synchronized state; and writing said transaction data from an online transaction into the target file in the primary append-only table in the primary database and, if said primary database and said mirror database are determined to be in said synchronized state, mirror writing said transaction data in the target file to another end of previously committed data in a mirror append-only table corresponding to said primary append-only table in the mirror database;

otherwise, if the primary database and the mirror database are not in a synchronized state, writing said transaction data in the target file only in the primary append-only table and catching up said mirror database during mirror resynchronization.

15. The non-transitory computer readable storage medium of claim 14 further comprising instructions for determining a committed End of File (EOF) of the append-only data on said primary database and a loss EOF of data written to the mirror database before loss of synchronization, and sending data written to the primary database target file between the committed EOF and the loss EOF for writing to the mirror database during mirror resynchronization.

16. The non-transitory computer readable storage medium of claim 15 further comprising instructions for checking, under a system lock, the committed EOF and the loss EOF before appending new data to said mirror append-only table, and writing only to the primary database if the EOFs are different.

17. The non-transitory computer readable storage medium of claim 16, wherein upon the committed and loss EOF being the same, said instructions mirror write to the primary database and the mirror database during resynchronization.

18. The non-transitory computer readable storage medium of claim 16 further comprising instructions operative during said transaction committing for recording a new committed EOF as a persistent entry in a table and using said new committed EOF during mirror resynchronization to catch up the mirror database.

* * * * *